United States Patent
Cho et al.

(10) Patent No.: US 9,638,104 B2
(45) Date of Patent: May 2, 2017

(54) GAS TURBINE DEVICE USING SUPERCRITICAL FLUID AS COOLING FLUID

(71) Applicant: INDUSTRY-ACADEMIC COOPERATION FOUNDATION YONSEI UNIVERSITY, Seoul (KR)

(72) Inventors: Hyung Hee Cho, Seoul (KR); Kyung Min Kim, Seongnam-si (KR); Ho Kyu Moon, Seoul (KR); Beom Seok Kim, Seoul (KR); Jun Su Park, Seoul (KR); Seon Ho Kim, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 242 days.

(21) Appl. No.: 14/262,970

(22) Filed: Apr. 28, 2014

(65) Prior Publication Data

US 2015/0167554 A1 Jun. 18, 2015

(30) Foreign Application Priority Data

Dec. 12, 2013 (KR) .......................... 10-2013-0154771

(51) Int. Cl.
*F02C 7/18* (2006.01)
*F02C 7/16* (2006.01)
(Continued)

(52) U.S. Cl.
CPC .................. *F02C 7/18* (2013.01); *F02C 1/08* (2013.01); *F02C 6/18* (2013.01); *F02C 7/12* (2013.01);
(Continued)

(58) Field of Classification Search
CPC ...... F02C 7/12; F02C 7/16; F02C 7/18; F02C 1/08; F02C 6/18; F23M 5/08; F23R 3/005; F05D 2210/14
(Continued)

(56) References Cited

U.S. PATENT DOCUMENTS 4,507,914 A * 4/1985 Rice .................. F01D 5/185
                                                      415/114
5,906,095 A * 5/1999 Frutschi ............... F01K 21/042
                                                      60/39.182
(Continued)

FOREIGN PATENT DOCUMENTS

JP        2012-057613 A        3/2012
JP        2013-151937 A        8/2013
(Continued)

OTHER PUBLICATIONS

KIPO Office Action for Korean Patent Application No. 10-2013-0154771 which corresponds to the above-identified application.

*Primary Examiner* — Steven Sutherland
(74) *Attorney, Agent, or Firm* — LRK Patent Law Firm

(57) ABSTRACT

The present invention relates to a gas turbine device using a supercritical fluid as a cooling fluid, the gas turbine device having a compressor for compressing air, a combustor for burning the air emitted from the compressor and fuel, and a turbine driven by the burned gas emitted from the combustor, wherein the gas turbine device includes cooling passages formed in the combustor and the turbine, along which the supercritical fluid as a cooling fluid flows to allow the combustor and the turbine to be cooled.

7 Claims, 11 Drawing Sheets

(51) Int. Cl.
    *F02C 7/12*       (2006.01)
    *F02C 1/08*       (2006.01)
    *F02C 6/18*       (2006.01)
    *F23M 5/08*      (2006.01)
    *F23R 3/00*      (2006.01)

(52) U.S. Cl.
    CPC ............... *F02C 7/16* (2013.01); *F23M 5/08* (2013.01); *F23R 3/005* (2013.01); *F05D 2210/14* (2013.01)

(58) Field of Classification Search
    USPC ............... 60/39.15, 39.181, 39.183, 806
    See application file for complete search history.

(56) References Cited

U.S. PATENT DOCUMENTS

| | | | | |
|---|---|---|---|---|
| 6,205,762 | B1* | 3/2001 | Uematsu | F01K 23/10 60/39.182 |
| 6,293,086 | B1* | 9/2001 | Reynolds | F02C 3/30 60/39.5 |
| 6,354,073 | B1* | 3/2002 | Hiramoto | F01K 23/106 60/39.182 |
| 6,957,539 | B2* | 10/2005 | Lebas | B01D 53/1475 60/39.17 |
| 2004/0003583 | A1* | 1/2004 | Uematsu | F01K 23/106 60/39.182 |
| 2013/0305732 | A1 | 11/2013 | Benz et al. | |

FOREIGN PATENT DOCUMENTS

| | | |
|---|---|---|
| KR | 1990-0011968 A | 8/1990 |
| KR | 10-2013-0021475 A | 3/2013 |

\* cited by examiner

|  | Single Gas Turbin (Flow=435.3 kg/s, Fuel=9.68 kg/s) | Gas Turbine & Supercriticaal Turbine Combined Cycle (Flow=360.38 kg/s, Fuel=9.68 kg/s) |
| --- | --- | --- |
| GT Turbine Power Output | 357.629 MW | 331.834 MW |
| GT Compressor Power Used | 176.306 MW | 146.520 MW |
| GT Shaft Power | 181.323 MW | 185.314 MW |
| GT Generator Losses | 3.626 MW | 3.718 MW |
| GT Net Cycle Power | 177.696 MW | 181.596 MW |
| $CO_2$ Tubine Shaft Power | NA | 0.621 MW |
| Net Cycle Power | 177.696 MW | 182.217 MW |
| Efficiency | 38.674 | 39.653 |

FIG. 7

GAS TURBINE DEVICE USING SUPERCRITICAL FLUID AS COOLING FLUID

BACKGROUND OF THE INVENTION

Field of the Invention

The present invention relates to a gas turbine device, and more particularly, to a gas turbine device using a supercritical fluid as a cooling fluid.

Background of the Related Art

A gas turbine device basically includes a compressor, a combustor and a turbine. The gas turbine device compresses air through the compressor, supplies the compressed air to the combustor, and burns the compressed air through the distribution of fuel. At this time, high temperature and pressure gas occurring from the combustion is expanded and emitted to the turbine, thus rotating the turbine. Generally, the compressor and the turbine are connected directly or indirectly to each other by means of one shaft, and the power activating the compressor is used with 25~30% of the output generated from the turbine. Accordingly, the output of the gas turbine device rotating a generator, a propeller and so on means the output obtained by subtracting the output needed for activating the compressor from the output generated from the turbine. As shown in FIG. 1, a conventional gas turbine device makes use of compressed air so as to perform cooling for high temperature parts (for example, combustor, vane, blade, casing, etc.), and at this time, the air compressed through a compressor 100 is used. However, since a portion of the compressed cooling fluid is sent to a combustor 200 and a turbine 300 and used for cooling them, the efficiency of the whole gas turbine device may be lower than that when the total compressed air is used.

SUMMARY OF THE INVENTION

Accordingly, the present invention has been made in view of the above-mentioned problems occurring in the prior art, and it is an object of the present invention to provide a gas turbine device using a supercritical fluid as a cooling fluid wherein the gas turbine device is provided with a compressor for compressing air, a combustor for burning the air emitted from the compressor and fuel, and a turbine driven by the burned gas emitted from the combustor, the gas turbine device including cooling passages formed in the combustor and the turbine, along which the supercritical fluid as the cooling fluid flows to allow the combustor and the turbine to be cooled, thus improving the efficiency of the gas turbine device.

It is another object of the present invention to provide a gas turbine device using a supercritical fluid as a cooling fluid wherein the gas turbine device is provided with a main power generation gas turbine device and an auxiliary power generation gas turbine device having a supercritical fluid compressor and a supercritical fluid turbine, the outlet of the supercritical fluid compressor being connected to the inlet of the cooling passage formed in the combustor or the turbine of the main power generation gas turbine device, and the inlet of the supercritical fluid turbine being connected to the outlet of the cooling passage formed in the combustor or the turbine of the main power generation gas turbine device, so that the supercritical fluid is compressed in the supercritical fluid compressor, heated through the cooling passage, supplied to the supercritical fluid turbine, and operates the auxiliary power generation gas turbine device, thus performing additional power generation.

It is yet another object of the present invention to provide a gas turbine device using a supercritical fluid as a cooling fluid wherein carbon dioxide is collected from the flue gas emitted as the burned gas from the gas turbine device and used as the supercritical fluid, thus preventing the occurrence of environmental problems.

To accomplish the above-mentioned objects, according to a first aspect of the present invention, there is provided a gas turbine device using a supercritical fluid as a cooling fluid, the gas turbine device including: a compressor for compressing air; a combustor for burning the air emitted from the compressor and fuel; a turbine driven by the burned gas emitted from the combustor; and cooling passages formed in the combustor and the turbine, along which the supercritical fluid as a cooling fluid flows to allow the combustor and the turbine to be cooled.

According to the present invention, preferably, the gas turbine device further includes a carbon dioxide collector for collecting carbon dioxide from the flue gas emitted from the turbine driven by the burned gas.

According to the present invention, preferably, the supercritical fluid is carbon dioxide.

To accomplish the above-mentioned objects, according to a second aspect of the present invention, there is provided a gas turbine device using a supercritical fluid as a cooling fluid, the gas turbine device including: a main power generation gas turbine device having a compressor for compressing air, a combustor for burning the air emitted from the compressor and fuel, a turbine driven by the burned gas emitted from the combustor, and cooling passages formed in the combustor and the turbine, along which the supercritical fluid as a cooling fluid flows to allow the combustor and the turbine to be cooled; and an auxiliary power generation gas turbine device an auxiliary power generation gas turbine device having a supercritical fluid compressor and a supercritical fluid turbine, the outlet of the supercritical fluid compressor being connected to the inlet of the cooling passage formed in the combustor or the turbine of the main power generation gas turbine device, and the inlet of the supercritical fluid turbine being connected to the outlet of the cooling passage formed in the combustor or the turbine of the main power generation gas turbine device, wherein the supercritical fluid is compressed in the supercritical fluid compressor, heated through the cooling passage, and supplied to the supercritical fluid turbine.

According to the present invention, preferably, the supercritical fluid is carbon dioxide.

According to the present invention, preferably, the gas turbine device further includes a carbon dioxide collector for collecting carbon dioxide from the flue gas emitted from the turbine driven by the burned gas in the main power generation gas turbine device.

According to the present invention, preferably, the carbon dioxide collected in the carbon dioxide collector is cooled and supplied to the supercritical fluid compressor in the auxiliary power generation gas turbine device.

According to the present invention, preferably, the auxiliary power generation gas turbine device is connected to the cooling passage formed in the combustor and to the cooling passage formed in the turbine, respectively.

According to the present invention, preferably, one auxiliary power generation gas turbine device is connected to a coupling inlet portion where the inlets of the cooling passages of the combustor and the turbine are connected to form one inlet and to a coupling outlet portion where the outlets of the cooling passages of the combustor and the turbine are connected to form one outlet.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 7 shows a comparison table between power and efficiencies of the conventional gas turbine device and the gas turbine device according to the present invention.

DETAILED DESCRIPTION OF THE PREFERRED EMBODIMENT

Hereinafter, an explanation on a gas turbine device using a supercritical fluid as a cooling fluid according to the present invention will be in detail given with reference to the attached drawing.

Figure 1:
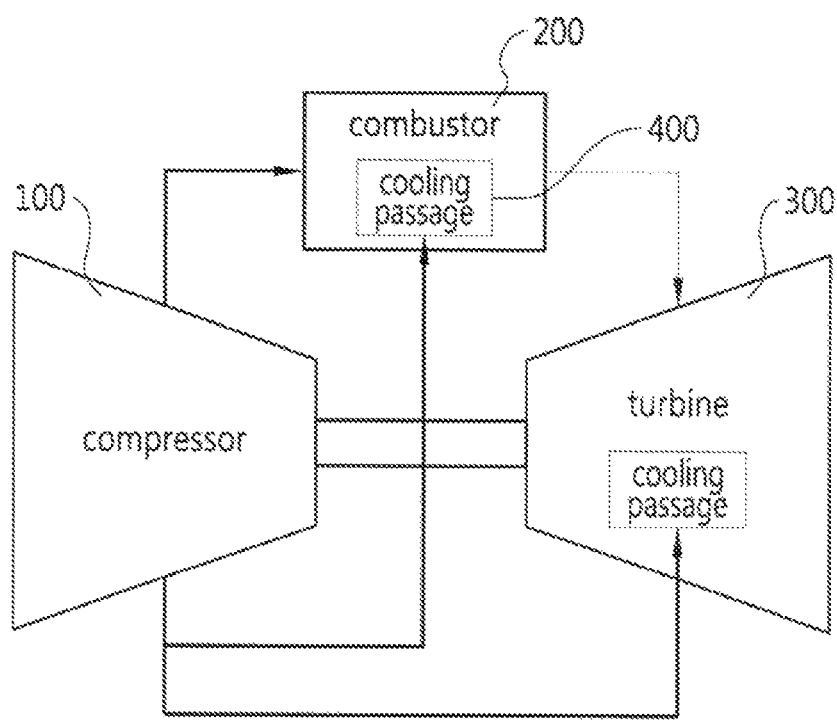
FIG. 1 shows a conventional gas turbine device for cooling a combustor and a turbine.
Figure 2:
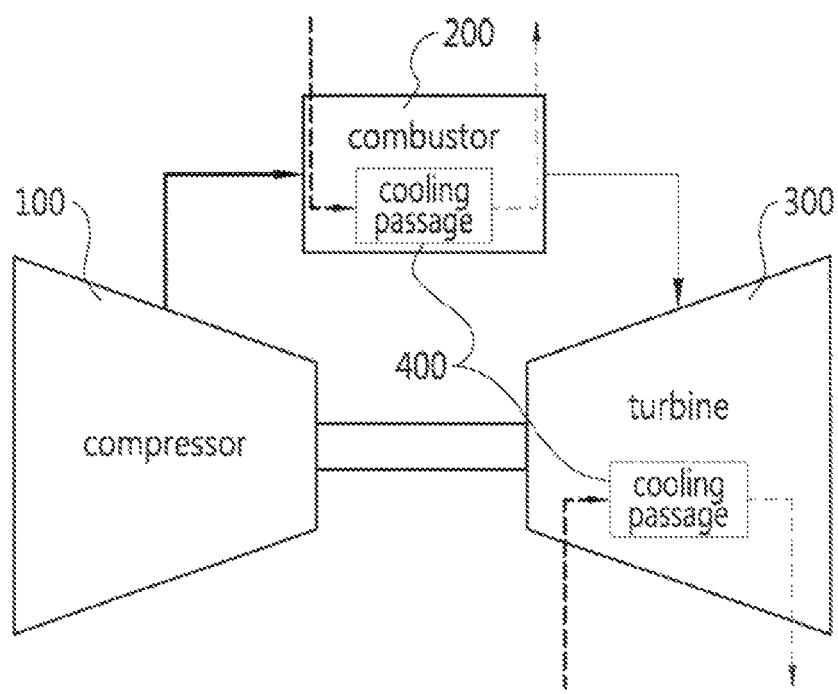
FIG. 2 shows a gas turbine device using a supercritical fluid for cooling a combustor and a turbine according to a first embodiment of the present invention.
Figure 3A:
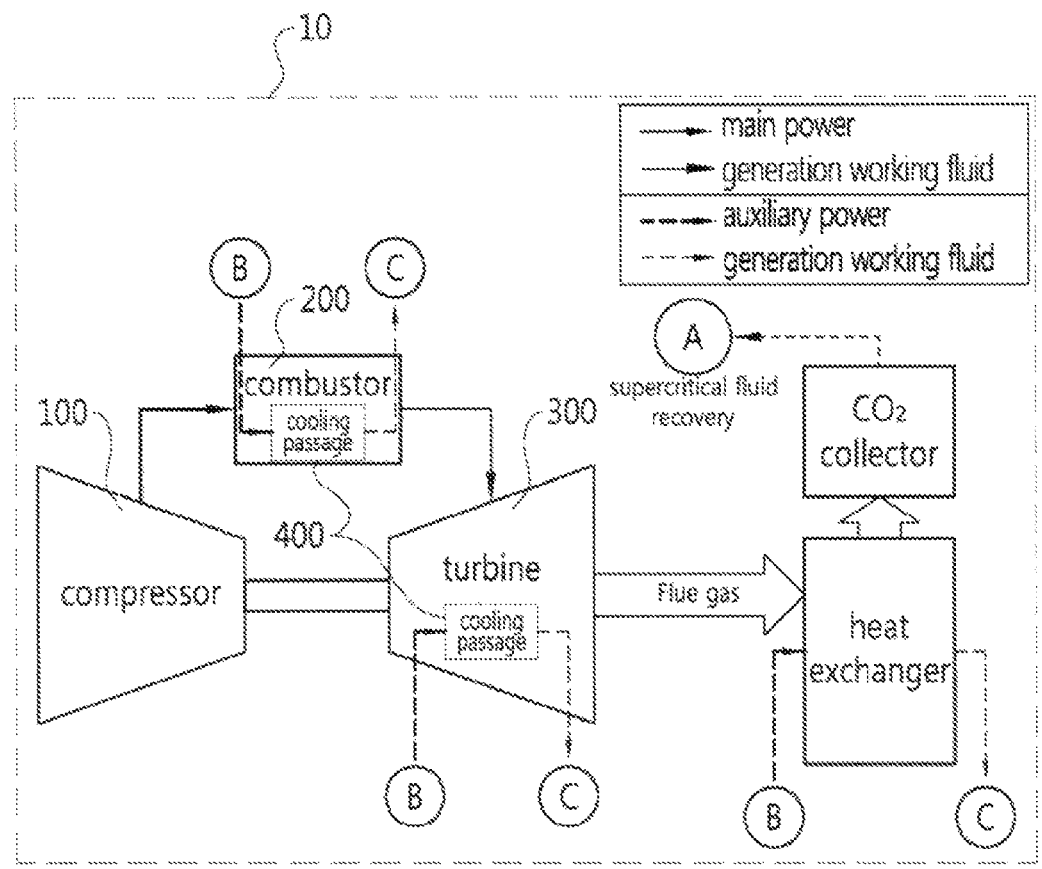
FIGS. 3A to 3E show a gas turbine device having a main power generation gas turbine device and an auxiliary power generation gas turbine device according to a second embodiment of the present invention.
Figure 3B:
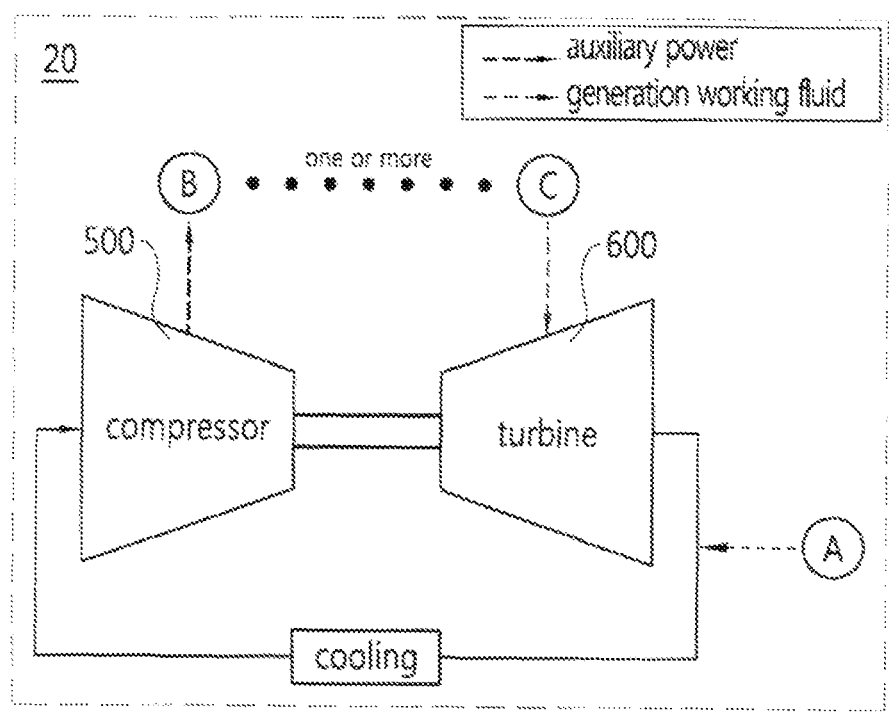
Figure 3C:
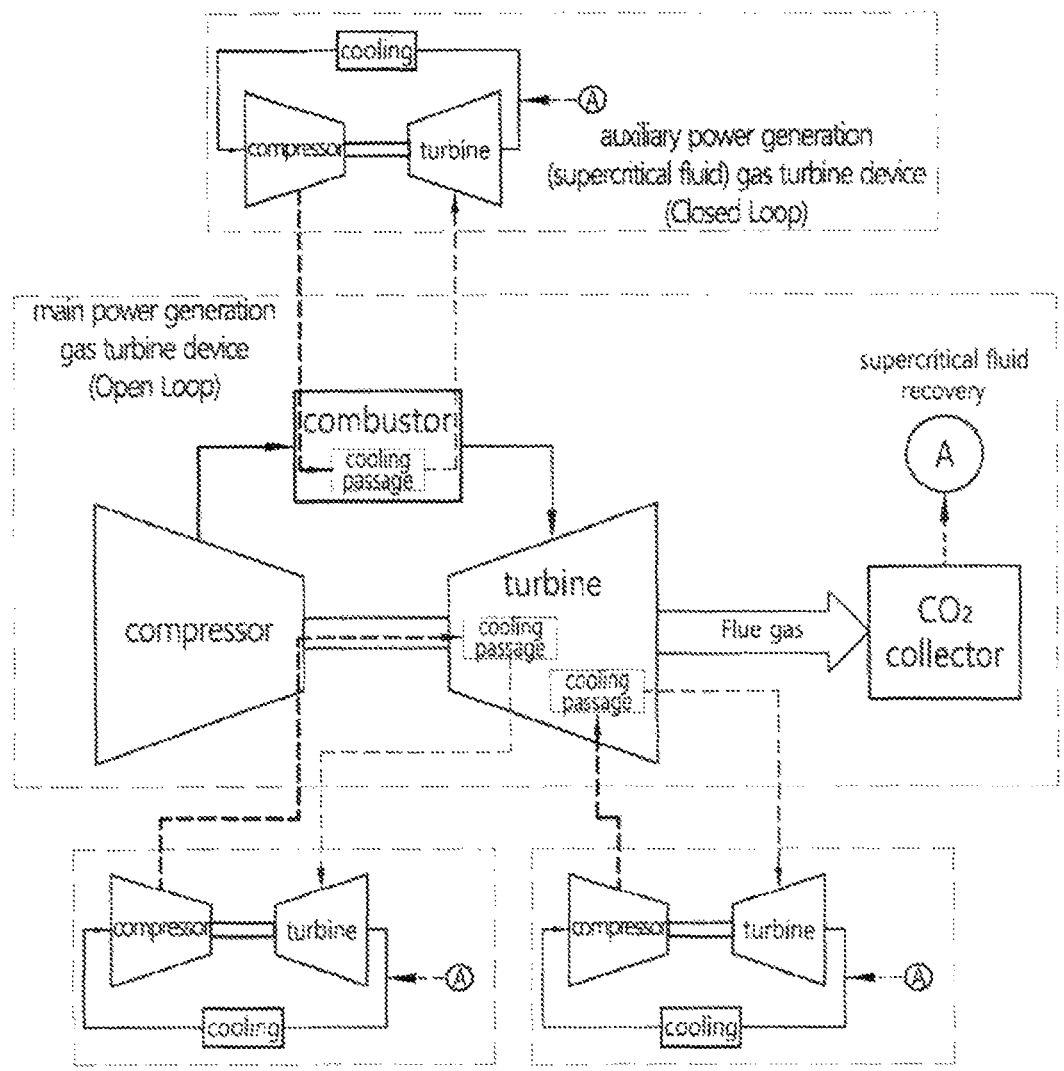
Figure 3D:
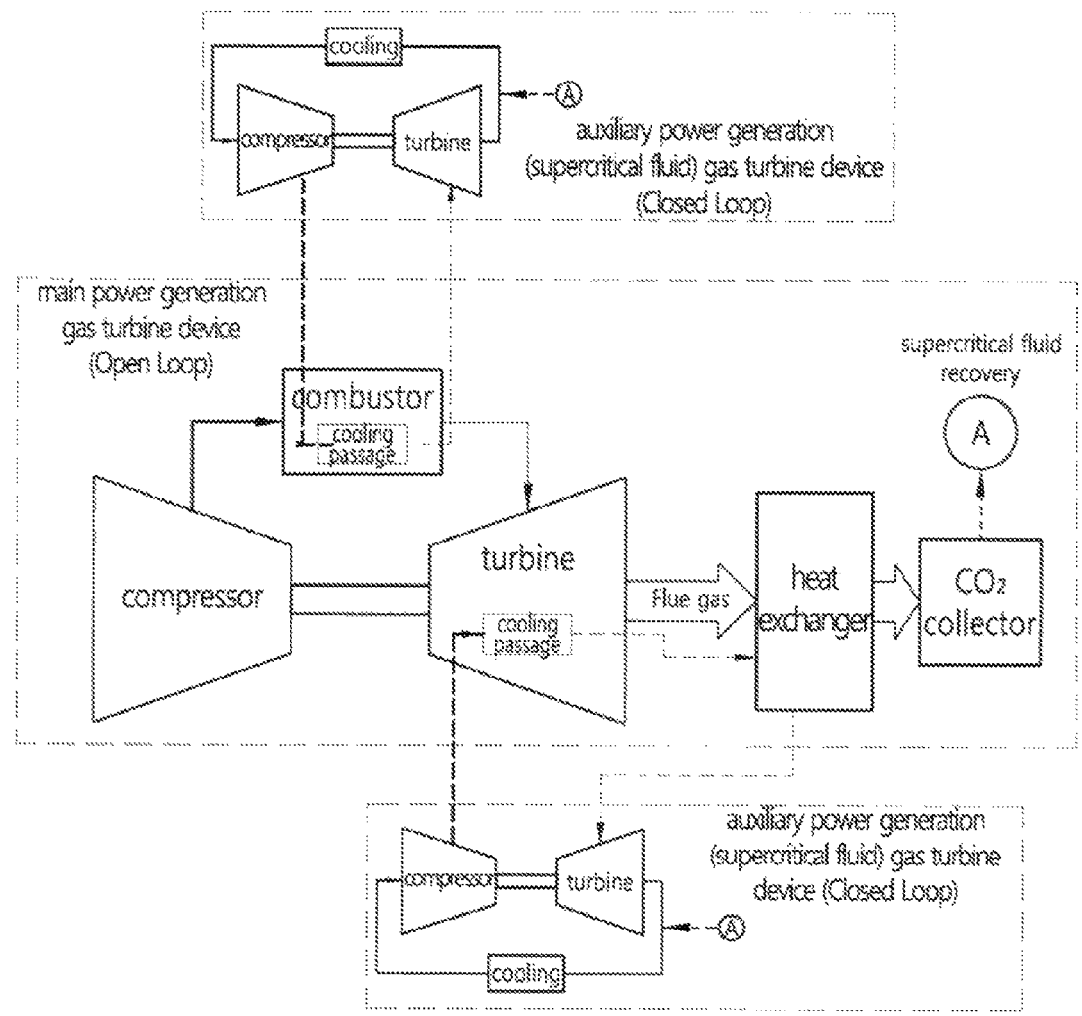
Figure 3E:
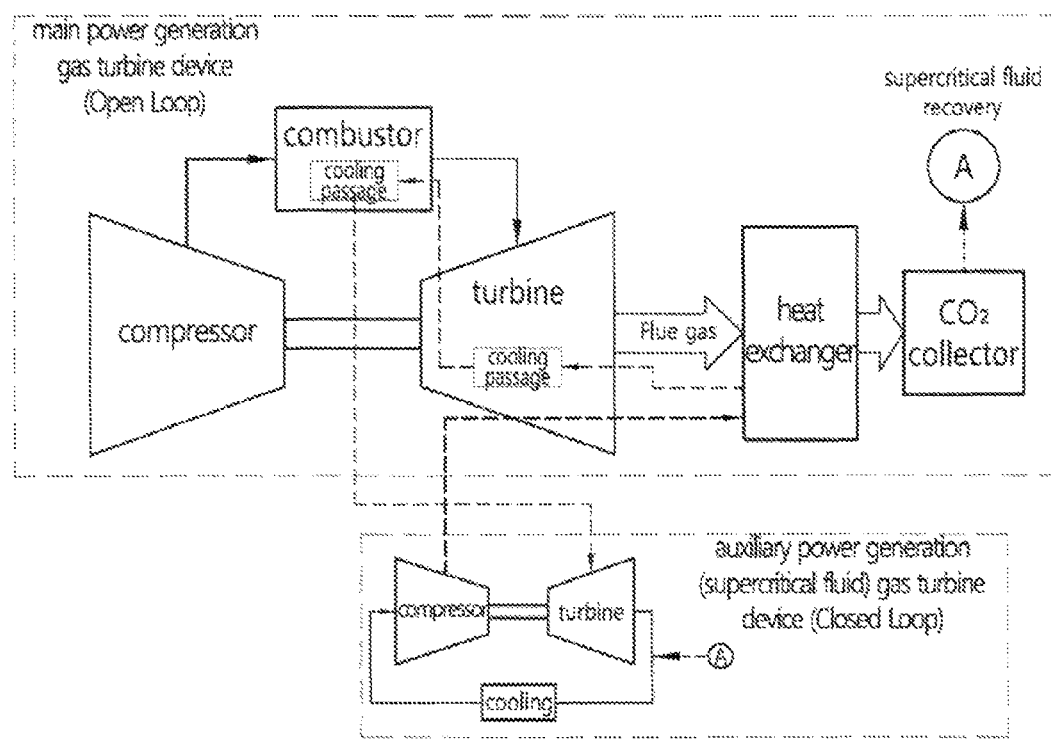

FIG. 2 shows a gas turbine device using a supercritical fluid for cooling a combustor and a turbine according to a first embodiment of the present invention. As shown in FIG. 2, a gas turbine device using a supercritical fluid according to a first embodiment of the present invention includes a compressor 100 for compressing air, a combustor 200 for burning the air emitted from the compressor 100 and fuel, a turbine 300 driven by the burned gas emitted from the combustor 200, and cooling passages 400 formed in the combustor 200 and the turbine 300, along which the supercritical fluid as a cooling fluid flows to allow the combustor 200 and the turbine 300 to be cooled.

The supercritical fluid is any substance at a temperature and pressure above its critical point, where distinct liquid and gas phases do not exist, and it has a molecular density close to the liquid phase, whereas having a low viscosity close to the gas phase.

If a substance which becomes gas or liquid at given temperature and pressure is over given high temperature and pressure, that is, the critical point, no evaporation occurs to cause liquid and gas phases to be not distinguished from each other, which means a critical state. The substance is called the supercritical fluid. One of the supercritical fluids having such properties, which has a critical temperature relatively close to a normal temperature, is carbon dioxide, and accordingly, the carbon dioxide is used as the supercritical fluid used in the present invention.

Unlike the conventional gas turbine device, therefore, the gas turbine device according to the present invention includes the cooling passages 400 formed in the combustor 200 and the turbine 300 where cooling is needed, so that the combustor 200 and the turbine 300 are cooled not by the compressed air in the compressor 100, but by separate supercritical fluid, thus increasing the power efficiency.

Figure 4:
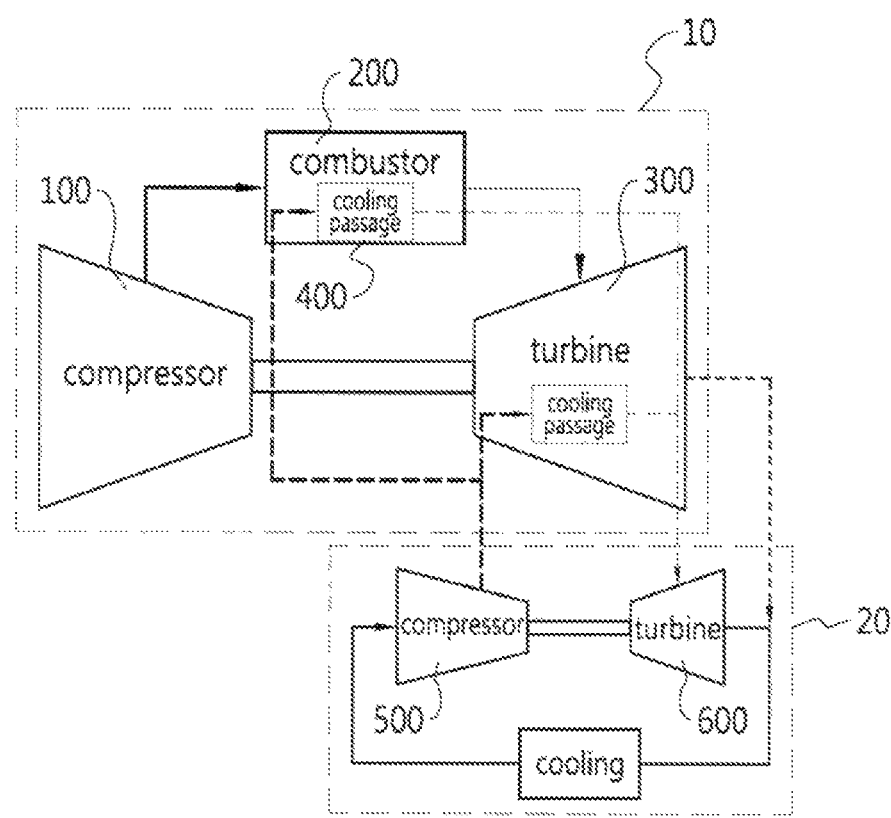
FIG. 4 shows a gas turbine device having a main power generation gas turbine device and an auxiliary power generation gas turbine device according to a third embodiment of the present invention.

FIGS. 3A to 3E show a gas turbine device having a main power generation gas turbine device and an auxiliary power generation gas turbine device according to a second embodiment of the present invention, and FIG. 4 shows a gas turbine device having a main power generation gas turbine device and an auxiliary power generation gas turbine device according to a third embodiment of the present invention. Referring to FIGS. 3A to 3E and 4, according to the second and third embodiments of the present invention, the supercritical fluid is a separate driving fluid, which drives an auxiliary power generation gas turbine device 20 so as to increase the power generation.

In more detail, a main power generation gas turbine device 10 includes a compressor 100 for compressing air, a combustor 200 for burning the air emitted from the compressor 100 and fuel, a turbine 300 driven by the burned gas emitted from the combustor 200, and cooling passages 400 formed in the combustor 200 and the turbine 300, along which the supercritical fluid as a cooling fluid flows to allow the combustor 200 and the turbine 300 to be cooled, wherein the main power generation gas turbine device 10 forms an open loop.

The auxiliary power generation gas turbine device 20 combined with the main power generation gas turbine device 10 includes a supercritical fluid compressor 500 and a supercritical fluid turbine 600, wherein the outlet of the supercritical fluid compressor 500 is connected to the inlet of the cooling passage 400 formed in the combustor 200 or the turbine 300 of the main power generation gas turbine device 10, and the inlet of the supercritical fluid turbine 600 is connected to the outlet of the cooling passage 400 formed in the combustor 200 or the turbine 300 of the main power generation gas turbine device 10, so that the supercritical fluid is compressed in the supercritical fluid compressor 500, heated through the cooling passage 400, supplied to the supercritical fluid turbine 600, and operates the auxiliary power generation gas turbine device 20, and the auxiliary power generation gas turbine device 20 forms a closed loop.

Further, carbon dioxide is usable as the supercritical fluid, and at this time, the carbon dioxide emitted from the turbine 300 driven by the burned gas in the main power generation gas turbine device 10 is used as the supercritical fluid. The carbon dioxide is collected in a carbon dioxide collector, and the collected carbon dioxide is cooled and supplied to the supercritical fluid compressor 500 of the auxiliary power generation gas turbine device 20, which is circulatedly carried out.

As shown in FIGS. 3A to 3E, portions B and C of the auxiliary power generation gas turbine device 20 are connected correspondingly to portions B and C of the combustor 200 and the turbine 300, and further, carbon dioxide is collected from the flue gas emitted from the main power generation gas turbine device 10 and supplied to the auxiliary power generation gas turbine device 20 (through the connection of portions A).

Further, as shown in FIG. 4, the auxiliary power generation gas turbine device 20 is connected to a coupling inlet portion where the inlets of the cooling passages 400 of the combustor 200 and the turbine 300 are connected to form one inlet and to a coupling outlet portion where the outlets of the cooling passages 400 of the combustor 200 and the turbine 300 are connected to form one outlet.

Further, heat to be additionally needed is obtained through the heat exchanging of waste heat of the flue gas of the gas turbine device.

Figure 5:
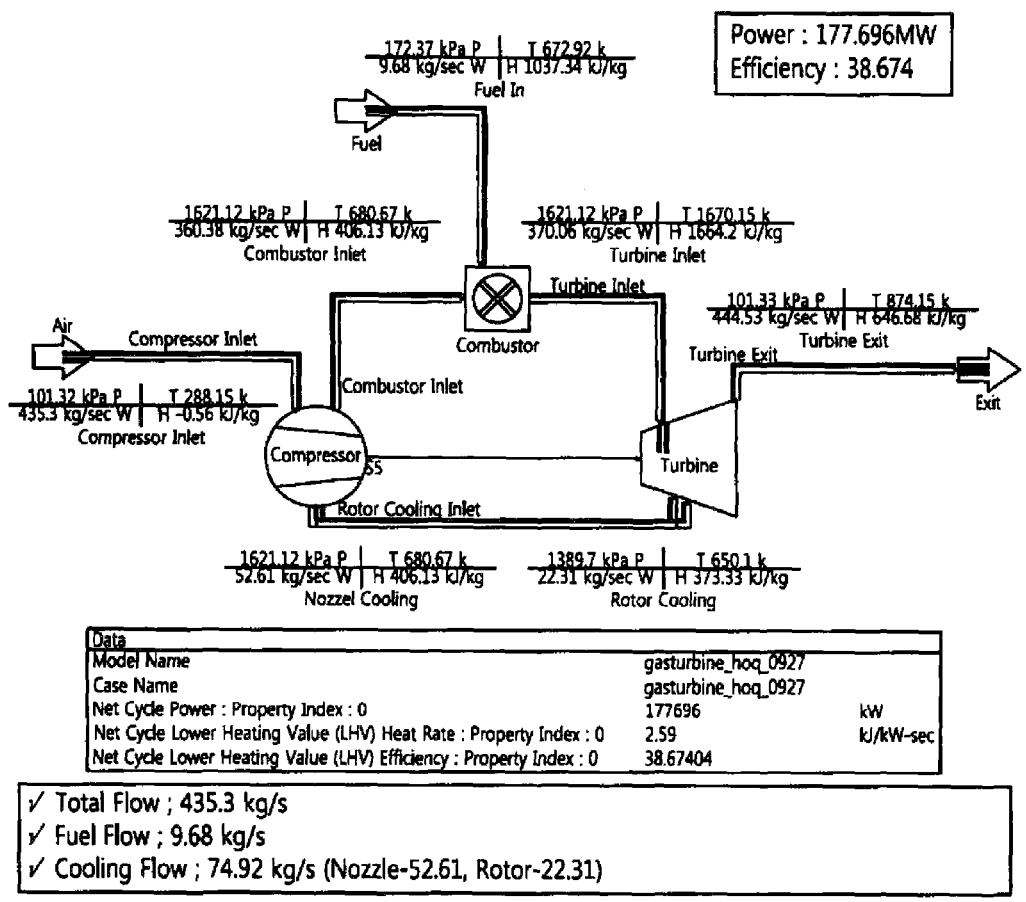
FIG. 5 shows a simulation result in the conventional gas turbine device obtained using the Gatecycle program made by GE company.
Figure 6:
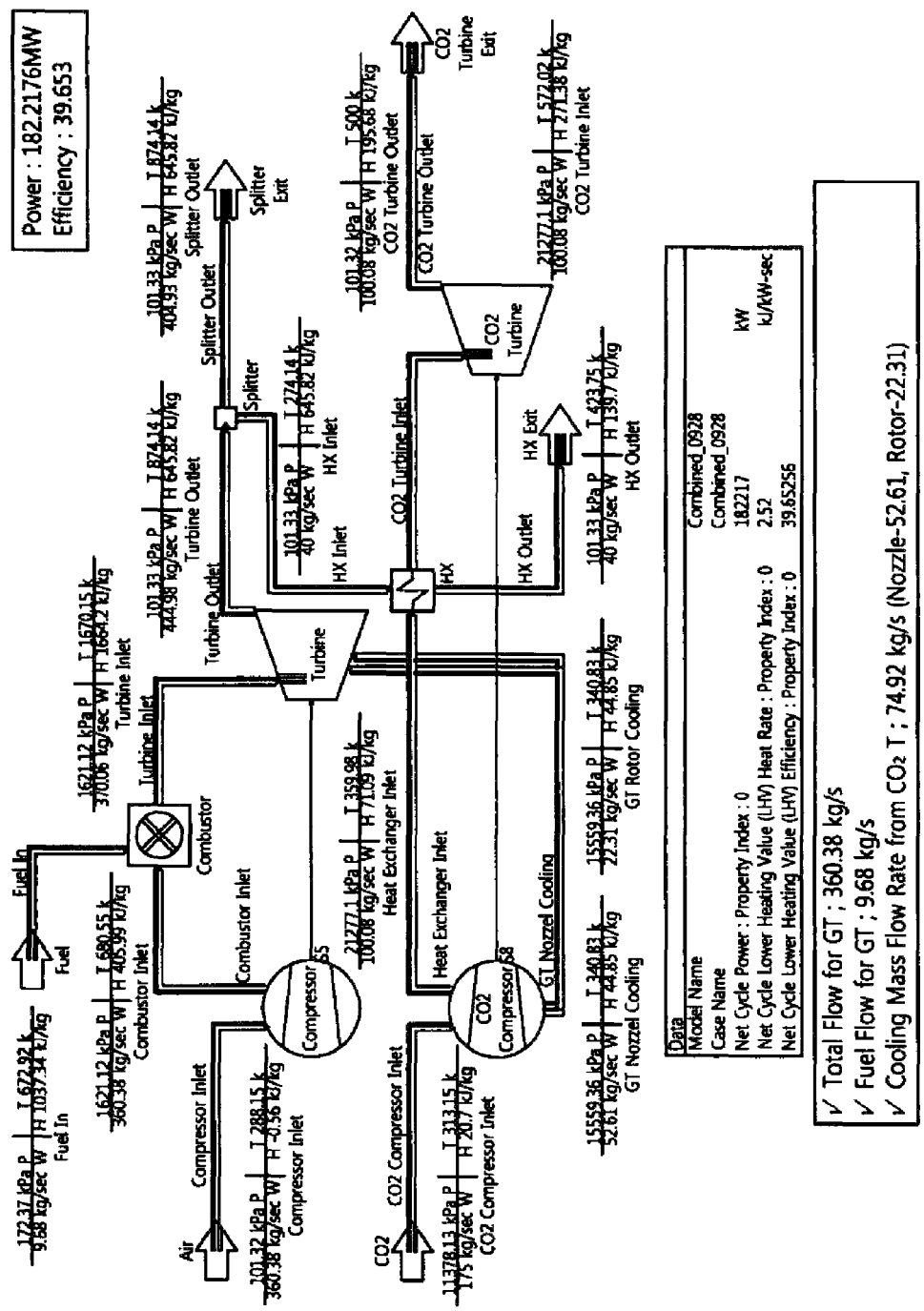
FIG. 6 shows a simulation result in the gas turbine device according to the present invention obtained using the Gatecycle program made by GE company.

FIG. 5 shows a simulation result in the conventional gas turbine device obtained using the Gatecycle program made by GE company, FIG. 6 shows a simulation result in the gas turbine device according to the present invention obtained using the Gatecycle program made by GE company, and FIG. 7 shows a comparison table between power and efficiencies of the conventional gas turbine device and the gas turbine device according to the present invention.

Referring to FIGS. 5 to 7 showing the simulation results of the power and efficiencies between the conventional single gas turbine device and the combined gas turbine device according to the present invention where the main power generation gas turbine device 10 and the auxiliary power generation gas turbine device 20 are coupled to each other, using Gatecycle program made by GE company, it can be checked that the gas turbine device according to the present invention shows the power output and efficiency higher than the conventional single gas turbine device when the same amount of fuel as each other is provided.

As set forth in the foregoing, the gas turbine device using the supercritical fluid as the cooling fluid according to the present invention is provided with the compressor for compressing air, the combustor for burning the air emitted from the compressor and fuel, the turbine driven by the burned gas emitted from the combustor, and the cooling passages formed in the combustor and the turbine, along which the supercritical fluid as the cooling fluid flows to allow the combustor and the turbine to be cooled, thus improving the efficiency of the gas turbine device.

Further, the gas turbine device using the supercritical fluid as the cooling according to the present invention includes the main power generation gas turbine device and the auxiliary power generation gas turbine device having the supercritical fluid compressor and the supercritical fluid turbine disposed therein, wherein the outlet of the supercritical fluid compressor is connected to the inlet of the cooling passage formed in the combustor or the turbine of the main power generation gas turbine device, and the inlet of the supercritical fluid turbine is connected to the outlet of the cooling passage formed in the combustor or the turbine of the main power generation gas turbine device, so that the supercritical fluid is compressed in the supercritical fluid compressor, heated through the cooling passage, supplied to the supercritical fluid turbine, and operates the auxiliary power generation gas turbine device, thus performing additional power generation.

Additionally, the gas turbine device using the supercritical fluid as the cooling fluid according to the present invention collects carbon dioxide from the flue gas emitted from the gas turbine device and used as the supercritical fluid, thus preventing the occurrence of environmental problems.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A gas turbine device using a supercritical fluid as a cooling fluid, the gas turbine device comprising:
   a compressor (100) for compressing air;
   a combustor (200) for burning the air emitted from the compressor (100) and fuel;
   a turbine (300) driven by a burn gas, which is obtained by burning the air and the fuel and emitted from the combustor (200); and
   cooling passages (400) formed in the combustor (200) and the turbine (300), along which the supercritical fluid as a cooling fluid flows- to allow the combustor (200) and the turbine (300) to be cooled,
   wherein the supercritical fluid is carbon dioxide.

2. The gas turbine device according to claim 1, further comprising a carbon dioxide collector for collecting carbon dioxide from a flue gas emitted from the turbine (300) driven by the burned gas emitted from the combustor (200), wherein the collected carbon dioxide is used as the cooling fluid.

3. A gas turbine device using a supercritical fluid as a cooling fluid, the gas turbine device comprising:
   a main power generation gas turbine device (10) having a compressor (100) for compressing air, a combustor (200) for burning the air emitted from the compressor (100) and fuel, a turbine (300) driven by a burned gas which is obtained by burning the air and the fuel and emitted from the combustor (200), and cooling passages (400) formed in the combustor (200) and the turbine (300), along which the supercritical fluid as a cooling fluid flows to allow the combustor (200) and the turbine (300) to be cooled; and
   an auxiliary power generation gas turbine device (20) having a supercritical fluid compressor (500) and a supercritical fluid turbine (600), an outlet of the supercritical fluid compressor (500) being connected to an inlet of the cooling passage (400) formed in the combustor (200) or the turbine (300) of the main power generation gas turbine device (10), and an inlet of the supercritical fluid turbine (600) being connected to an outlet of the cooling passage (400) formed in the combustor (200) or the turbine (300) of the main power generation gas turbine device (10), wherein the supercritical fluid is compressed in the supercritical fluid compressor (500), heated through the cooling passage (400), and supplied to the supercritical fluid turbine (600),
   wherein the supercritical fluid is carbon dioxide.

4. The gas turbine device according to claim 3, further comprising a carbon dioxide collector for collecting carbon dioxide from a flue gas emitted from the turbine (300) driven by the burned gas emitted from the combustor (200) in the main power generation gas turbine device (10).

5. The gas turbine device according to claim 4, wherein the carbon dioxide collected in the carbon dioxide collector is cooled and supplied to the supercritical fluid compressor (500) in the auxiliary power generation gas turbine device (20).

6. The gas turbine device according to claim 3, wherein the auxiliary power generation gas turbine device (20) is connected to the cooling passage (400) formed in the combustor (200) and to the cooling passage (400) formed in the turbine (300), respectively.

7. The gas turbine device according to claim 3, wherein one auxiliary power generation gas turbine device (20) is connected to a coupling inlet portion where inlets of the cooling passages (400) of the combustor (200) and the turbine (300) are connected to form one inlet and to a coupling outlet portion where outlets of the cooling passages (400) of the combustor (200) and the turbine (300) are connected to form one outlet.

* * * * *